(12) United States Patent
Jiang et al.

(10) Patent No.: US 10,891,511 B1
(45) Date of Patent: Jan. 12, 2021

(54) HUMAN HAIRSTYLE GENERATION METHOD BASED ON MULTI-FEATURE RETRIEVAL AND DEFORMATION

(71) Applicant: PLEX-VR DIGITAL TECHNOLOGY (SHANGHAI) CO., LTD., Shanghai (CN)

(72) Inventors: Qilei Jiang, Shanghai (CN); Yuanxi Ma, Shanghai (CN); Yingliang Zhang, Shanghai (CN)

(73) Assignee: PLEX-VR DIGITAL TECHNOLOGY (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 16/962,227

(22) PCT Filed: Sep. 23, 2019

(86) PCT No.: PCT/CN2019/107263
§ 371 (c)(1),
(2) Date: Jul. 15, 2020

(87) PCT Pub. No.: WO2020/063527
PCT Pub. Date: Apr. 2, 2020

(30) Foreign Application Priority Data

Sep. 30, 2018 (CN) .......................... 2018 1 1165895

(51) Int. Cl.
*G06K 9/62* (2006.01)
*G06T 7/33* (2017.01)
(Continued)

(52) U.S. Cl.
CPC ..... *G06K 9/6202* (2013.01); *G06F 16/24578* (2019.01); *G06F 16/532* (2019.01);
(Continued)

(58) Field of Classification Search
CPC ........... G06K 9/00288; G06K 9/00281; G06K 9/6218; G06K 9/6224; G06K 9/6253;
(Continued)

(56) References Cited

U.S. PATENT DOCUMENTS

2011/0299776 A1* 12/2011 Lee ..................... G06K 9/00234
382/173
2016/0148074 A1* 5/2016 Jean ...................... G06K 9/4671
382/190

(Continued)

FOREIGN PATENT DOCUMENTS

CN 103366400 A 10/2013
CN 103955962 A 7/2014
(Continued)

OTHER PUBLICATIONS

Chai ,Single Image 3D Hair Modeling Techniques and Applications ,Jan. 31, 2018.
(Continued)

*Primary Examiner* — Manuchehr Rahmjoo
(74) *Attorney, Agent, or Firm* — Winston Hsu

(57) ABSTRACT

A human hairstyle generation method based on multi-feature retrieval and deformation includes: acquiring a hair style mask; identifying feature points of a human face and match the feature points with a hair style database; aligning an image with a standard human face to acquire a corresponding hair region; calculating Minkowski distances between the hair region and hair masks of all frontal faces in the hair style database; assigning corresponding weights after sorting the Minkowski distances from small to large; training a deep learning network to detect hair styles of hair basic blocks at different scales; and taking out a most similar hair style picture. The present invention utilizes a single frontal photo of the human face, and retrieves a three-dimensional hair model most similar to the photo by retrieving a database (Continued)

in a mass three-dimensional hair style database, to avoid manual modeling, thereby improving efficiency and ensures high fidelity.

11 Claims, 3 Drawing Sheets

(51) Int. Cl.
- *G06T 3/00* (2006.01)
- *G06T 11/60* (2006.01)
- *G06T 3/40* (2006.01)
- *G06F 16/583* (2019.01)
- *G06F 16/532* (2019.01)
- *G06F 16/56* (2019.01)
- *G06F 16/2457* (2019.01)
- *G06N 20/00* (2019.01)
- *G06K 9/00* (2006.01)

(52) U.S. Cl.
CPC .......... *G06F 16/56* (2019.01); *G06F 16/5854* (2019.01); *G06K 9/00268* (2013.01); *G06K 9/6212* (2013.01); *G06K 9/6215* (2013.01); *G06K 9/6261* (2013.01); *G06N 20/00* (2019.01); *G06T 3/0006* (2013.01); *G06T 3/40* (2013.01); *G06T 7/337* (2017.01); *G06T 11/60* (2013.01); *G06T 2207/20081* (2013.01); *G06T 2207/30201* (2013.01)

(58) Field of Classification Search
CPC .. G06K 9/6256; G06K 9/6257; G06K 9/6267; G06K 9/6284; G01S 15/32; G01S 15/86; G01S 15/88; G01S 7/539; G06F 16/75; G06N 20/00; G06N 3/0454

See application file for complete search history.

(56) References Cited

U.S. PATENT DOCUMENTS

| | | | |
|---|---|---|---|
| 2017/0076142 A1* | 3/2017 | Chang | G06T 7/90 |
| 2019/0051048 A1* | 2/2019 | Zhou | G06K 9/4628 |
| 2020/0265218 A1* | 8/2020 | Dai | G06N 20/00 |

FOREIGN PATENT DOCUMENTS

| | | |
|---|---|---|
| CN | 106372652 A | 2/2017 |
| CN | 107615337 A | 1/2018 |
| CN | 108280397 A | 7/2018 |
| EP | 0897680 A2 | 2/1999 |
| KR | 10-2005-0018921 A | 2/2005 |
| WO | 2018/094653 A1 | 5/2018 |

OTHER PUBLICATIONS

Min, A classified method of human hair for hair sketching, Dec. 21, 2008.

Chen, A generative sketch model for human hair analysis and synthesis, Jul. 31, 2006.

Wang, Hair style retrieval by semantic mapping on informative patches, Dec. 21, 2011.

* cited by examiner (a) T = 0   (b) T = 1   (c) T = 2   (d) T = 3   (e) T = 10   (f) ground truth

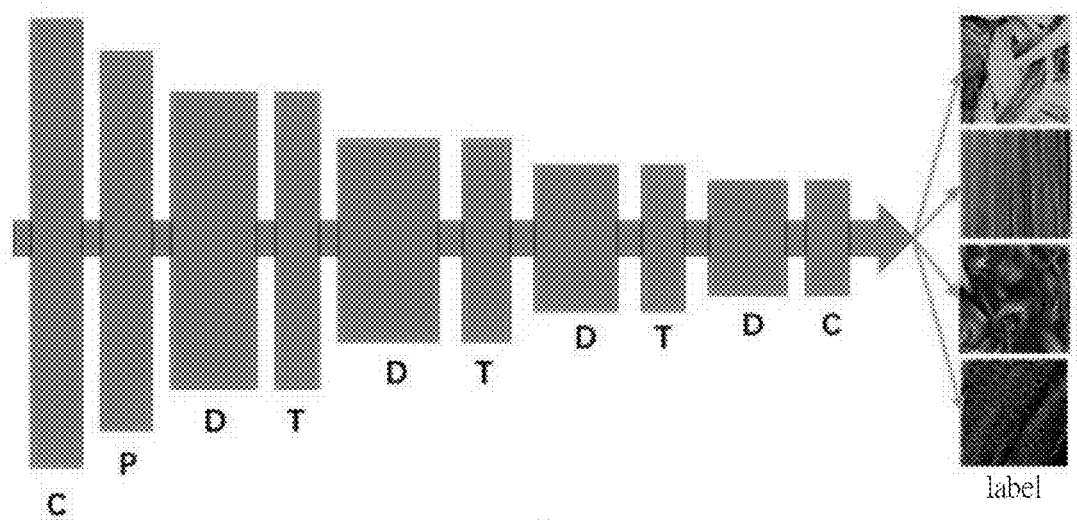
FIG. 5
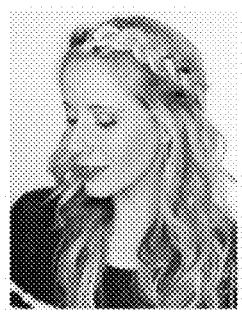  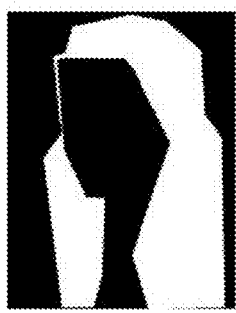  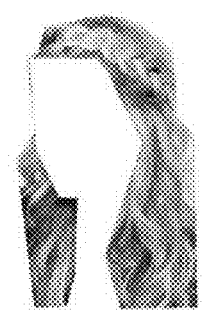  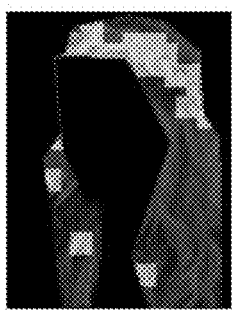
FIG. 6A     FIG. 6B     FIG. 6C     FIG. 6D

HUMAN HAIRSTYLE GENERATION METHOD BASED ON MULTI-FEATURE RETRIEVAL AND DEFORMATION

BACKGROUND OF THE INVENTION

1. Field of the Invention

The invention relates to a field of three dimensional images, and more particular, to a human hairstyle generation method based on multi-feature retrieval and deformation.

2. Description of the Prior Art

The generation of the hair model belongs to the three-dimensional head reconstruction technology, which is an important part of the virtual character image and one of the most important features of the virtual human. Usually, the head is separated into two parts of human face and hair.

For the hair reconstruction technology, currently widely used methods are: taking a frontal shot and a side shot as the information source; extracting feature points of the front and the side of face and hair of the character; generating a three-dimensional head model; generating a two-dimensional head texture based on hair feature points; mapping the two-dimensional head texture onto the three-dimensional head model; utilizing a Coons curved surface for fitting a hair region according to feature points of the hair region; and deforming the Coons curved surface for texture mapping.

Modeling based on a single photo generally extracts useful previous knowledge from a three-dimensional human face database, and then infers the three-dimensional model corresponding to the human face in the photo. Besides:

PCT/CN2016/107121 discloses a reconstructing method, device and terminal for a user hair model, including: acquiring a frontal human face image of a reconstructed user; determining an image of a hair region; matching the hair region with three-dimensional (3D) hair models in a hair style database, to acquire a 3D hair model closest to the image of the hair region; and determining the 3D hair model closest to the hair region is as the 3D hair model for reconstructing the user.

CN 201680025609.1 relates to a three-dimensional hair modeling method and device, including: determining a first coordinate transformation relationship between a 3D head model with hair to be restructured and a default reference head model; determining a second coordinate transformation relationship between the 3D head model and a default 3D hair template; registering the 3D head model and the 3D hair template according to the first coordinate transformation relationship and the second coordinate transformation relationship; matching the 3D hair template and the reference head model; and utilizing a radial basis function (RBF) to deform hairs within an error region in the registered 3D hair region template when detecting the error region in the registered 3D hair region template, to correct the error region; wherein the error region includes a region of the 3D hair template not completely covering a scalp layer region of the 3D head model or a hair root region of the 3D hair template covering a non-scalp layer region of the 3D head model.

CN 201310312500.4 relates to a method for automatically generating a three-dimensional (3D) head image, including: acquiring a three-dimensional human face database; collecting a three-dimensional hair style database; utilizing a human face detection algorithm to detect a human face in an input frontal photo of the human face; utilizing an active shape model to locate frontal human face feature points; generating a 3D human face model by a deformation model method based on the 3D human face database, the input frontal photo of the human face and coordinates of the human face feature points; utilizing a Markov random field based hair method to separate hairs from the input frontal photo of the human face; extract a hair texture according to a hair separation result; acquiring a final matched hair model; and synthesizing the human face model with the hair model. The method avoids manually adding hairstyles, and thus improves efficiency and ensures a high degree of fidelity.

CN201410161576.6 discloses a device for generating virtual human hair, including: an acquisition unit, for acquiring a frontal photo of a human face; a first determination unit, for determining a three-dimensional head model based on the acquired frontal photo of the human face, and determining an adaptation value of a hair template; a second determination unit, for determining description information of a standard hair template corresponding to the adaptation value of the hair template from a corresponding relation between preset standard adaptation values of the hair template and the description information of the standard hair template according to the adaptation value of the hair template determined by the first determination unit; and a generating unit, for acquiring a dedicated hair template suitable for the three-dimensional head model according to the description information of the standard hair template determined by the second determining unit and the three-dimensional head model determined by the first determining unit. When reconstructing a person's hair in the photo, only one frontal photo of the person is needed and no hair feature points need to be collected.

SUMMARY OF THE INVENTION

In order to solve the above problems, it is therefore an objective of the present invention to provide a human hairstyle generation method, based on multi-feature retrieval and deformation In order to achieve the above objective, the technical solution adopted by the present invention includes the following steps:

1) automatically separate a hairstyle of a single picture to acquire corresponding hair style mask;

2) using a human face feature point recognition algorithm to identify the feature points of the human face of the input picture, and matching these feature points with the feature points of the standard human face of the hair style database to find the corresponding warping function;

3) using the acquired warping function to align the human face of the input picture with the standard face, so as to acquire the corresponding aligned hair region;

4) in order to acquire the similarity of the shape region, calculating corresponding Minkowski distances between an aligned hair style mask and all frontal hair styles in the hair style database to derive corresponding Minkowski distances, and assigning corresponding weights after sorting the Minkowski distances from small to large;

5) in order to retain detailed characteristics of the hair, calculating the detail similarity of the hair through the Hosdorff distance, and repeating the step 4) to assign weight, and combining the weights of 4) to sort the matched hair styles, and taking out the top ten most similar hairstyles;

6) calculating the flow direction fields of the ten most similar hairs to perform a matching operation with the detecting hair style, to acquire five more similar hair styles;

7) training the deep learning network to detect the hair styles of the hair basic blocks at different scales, wherein there are four basic hair styles such as straight hair, curly hair, small curly hair, and braided hair, and matching the detecting hair style with a histogram of 5 candidate hair styles with multiple scales, to acquire different matching scores, and acquiring the dissimilarity scores of each hair style in the hair style database according to the weighting of several distances, and sorting these scores and taking out the smallest score as the required hair model.

In step 3, aligning and matching the feature points of the human face with the feature points of the standard human face is solving a two-dimensional affine transformation:

$$\begin{bmatrix} u \\ v \end{bmatrix} = s \begin{bmatrix} \cos\theta & \sin\theta \\ \sin\theta & \cos\theta \end{bmatrix} \begin{bmatrix} x \\ y \end{bmatrix} + \begin{bmatrix} t_1 \\ t_2 \end{bmatrix}$$

$$sR\begin{bmatrix} x \\ y \end{bmatrix} + T$$

In the above formula, s is the scaling ratio, is the rotation angle, t represents the displacement of translation, where R is an orthogonal matrix in the above formula.

The step 4 includes retrieving the hair style mask based on the Minkowski distances; adding weights with respect to prominent features; retrieving the hair style mask again based on a Hosdorff distance; and retrieving the hair style mask based on hair flow information.

In the step 4, the hair style mask to be retrieved in the step 4 is defined as H, and a hair style mask in the hair style database is B, and a corresponding Minkowski distance is:

$$d = \sqrt[p]{\sum_{k=1}^{n} |H^k - B_i^k|^p}$$

wherein k is a subscript after pulling masks into one dimensional vectors, P is a parameter of Minkowski distance, where p can be taken as 2, and through the above formula, the detecting hair style is compared with all hair styles in the hair style database to derive the corresponding Minkowski distances, which are sorted from small to large to acquire a score ranking vector M of the corresponding hair styles in the hair style database.

The step 4 includes assigning corresponding higher weights for prominent hair style features; adding 25% weight for all the retrieved candidate hair styles based on a forehead part; setting a standard head bangs region as L, and comparing an L region of the single frontal image with an L region of a standard head for all inconsistencies after human face alignment, wherein places with the inconsistencies are increased by 1.25-fold weight; and adding and sorting prominent regions and the previous Minkowski distances, to derive an improved Minkowski distance vector $M_2$.

In the step 4, the hair style mask to be retrieved is defines as H and the standard hair style in the hair style database is defines as B, and a corresponding Hosdorff distance is $$d_H(H, B) = \max\left\{ \inf_{h \in H, b \in B} d(h, b), \inf_{b \in B, h \in H} d(h, b) \right\}$$

wherein sup represents an upper definite boundary, and inf represents a lower definite boundary, and the above formula is utilized for comparing the current detecting hair style with all the hair styles in the hair style database to derive the corresponding Minkowski distances, which are sorted from small to large to acquire a ranking vector H.

The step 4 includes acquiring the flow direction fields of the detecting hair style via a gradient-based method; for the single frontal image, finding a horizontal gradient of the detecting hair style:

$$d_x(i,j)=[I(i+1,j)-I(i-1,j)]/2;$$

finding a longitudinal gradient of the detecting hair style:

$$d_y(i,j)=[I(i,j+1)-I(i,j-1)]/2;$$

wherein a flow direction field C of the detecting hair style meets:

$$[C_x, C_y] \cdot [d_x, d_y]^T = 0;$$

deriving the flow direction field C from the above equations; and adding similarity of C as an evaluation standard for sorting, to acquire a sorting vector L.

The step 5 includes hair style recognition and matching based on the hair basic blocks, which includes utilizing different types of labeled hair data and a deep learning network to build a model training, to acquire a HairNet; sampling an input hair through a Gaussian pyramid to generate input images of different scales and standard images in the hair style database of different scales; performing super pixel division on a hair portion, and enlarging hair blocks universally, to acquire patches with a same size; and introducing the patches into the HairNet.

In step five, the hair style recognition and matching based on the basic block of the hair volume: using the labeled different types of hair data and using the deep learning network to build a model training to acquire the hair network;

Enter through the hair Gaussian pyramid sampling the various different standard image scales the input image and hairstyles database;

By super-pixel segmenting the hair part, and then uniformly pulling up these hair blocks, small pieces of the same size are acquired; the small pieces are imported into the hair network.

The step 6 includes retrieving based on combination of multiple features, which includes assigning weights a: b: c for $M_2$, H and L, respectively, and combining the three vectors into an overall sorting vector F:

$$F = aM_2 + bH + cL;$$

sorting the F from small to large and selecting first N elements as the candidate hair styles; and sorting the N candidate hair styles according to degrees of similarity of hair curliness or straightness, to select a highest ranked as a final retrieved candidate result.

Compared with the prior art, the present invention uses a single frontal photo of the human face to retrieve a three-dimensional hair model most similar to the photo by retrieving a database in a mass three-dimensional hair style database, to avoid manual modeling, thereby improving efficiency. Besides, the present invention deforms the retrieved model to a certain degree, so that the generated three-dimensional hair style and the input picture are as similar as possible, thereby ensuring a high fidelity.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 5 is a schematic diagram of an operation of hair style recognition and matching of hair basic block according to an embodiment of the present invention, wherein C: Cony layer, P: Pooling layer, D: 2d dense block, T: 2d Transition layer.

FIGS. 6a-d are schematic diagrams of hair style recognition and matching of hair basic block according to an embodiment of the present invention.

DETAILED DESCRIPTION

The present invention will be further described with reference to the drawings.

For high precision three-dimensional character portrait generation, an embodiment of the present embodiment provides a human hairstyle generation method based on multi-feature retrieval and deformation. By inputting a single frontal photo of a character, the method retrieves a three-dimensional hair model most similar with the photo in a mass three-dimensional hair style database according to the input photo, and performs a certain degree of deformation on the retrieved model, so that a generated three-dimensional hair style and the input photo are as similar as possible, so as to acquire a three-dimensional hair style of the input character portrait.

First is a data pre-processing stage. It is necessary to render frontal photos of all hair styles in the 3D hair style database and mask maps corresponding to hairs, and then determine a retrieved result by comparing 2D images.

Step 1: Separate a hairstyle.

Figure 1:
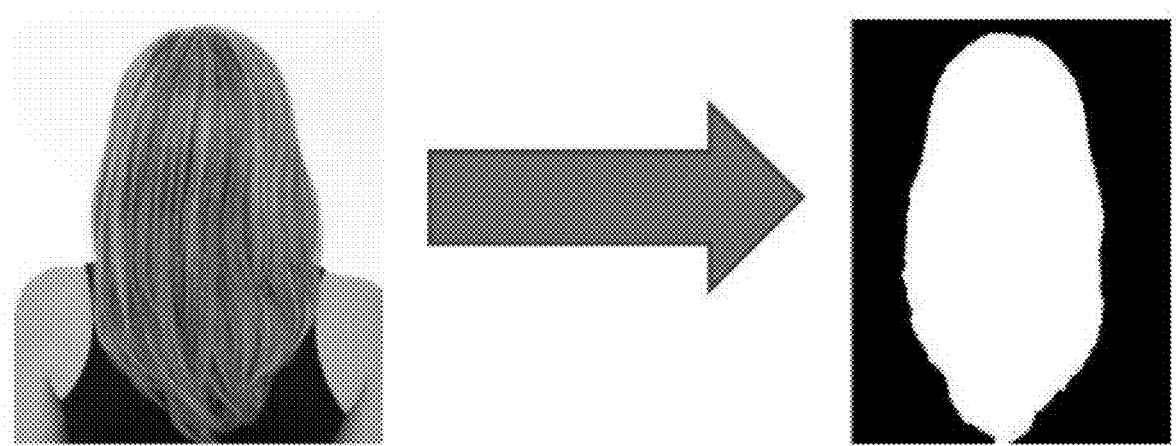
FIG. 1 is a schematic diagram of a mask acquisition operation according to an embodiment of the present invention.

In order to find a specific position of hairs in a single frontal image of a human face, first of all, the image needs to be separated to acquire a mask of shape, and the mask is further compared with masks in the hair style database. Please refer to FIG. 1, which is a schematic diagram of a mask acquisition operation according to an embodiment of the present invention. Hairstyle separation may be implemented either manually or automatically:

Manual implementation: PS (Photoshop), AE (After Effects) or other software that supports cutouts can be utilized for manually selecting a frame of a hair region to get a mask of the hair;

Automatic implementation: a large number of data sets can be built manually, and includes single frontal photos containing hair and corresponding hair style masks; by training a deep neural network, automatic separation of hair is performed.

Step 2: Human face feature point recognition and alignment.

In order to make a position of hair is almost identical, the input portrait should be aligned with face feature points before retrieving.

Figure 2:
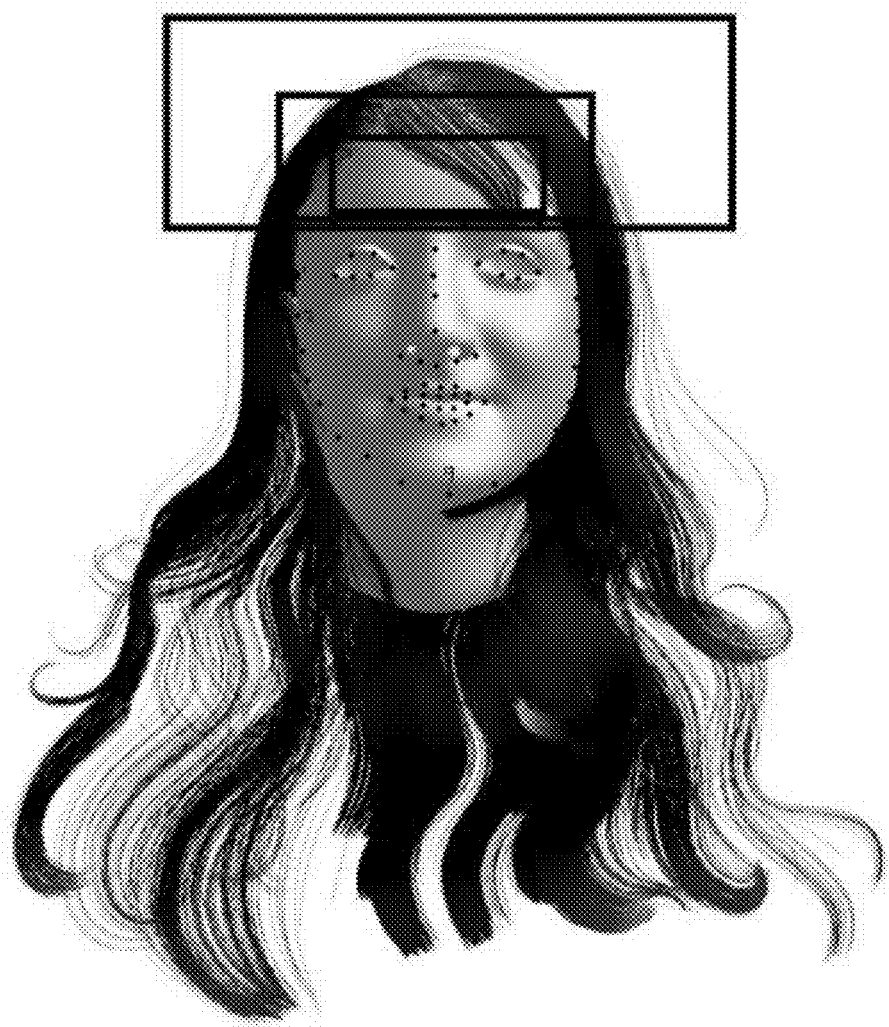
FIG. 2 is a schematic diagram of feature points marked on a human face according to an embodiment of the present invention.

First, please refer to FIG. 2, this embodiment marks 68 feature points on a standard human face.

Then, the human face feature points are detected by utilizing an ERT (ensemble of regression tree) cascade regression algorithm. The algorithm uses cascade regression factors. First, a series of marked human face pictures need to be used as a training set. In this embodiment, an open source data set is used, which contains about 2,000 pieces of training data with marked landmark, and this data set is used to train a primary face feature point predictor based on deep convolutional neural network (DCNN). The network uses a convolutional neural network structure as the basis for training. When a picture is acquired, an initial shape is generated, i.e. an approximate feature point position is estimated first, and then a gradient boosting algorithm is utilized for reducing a sum of squared errors between the initial shape and approved ground truth. A least square method is used to minimize the errors, and the cascade regression factor of each level is acquired. The core formula is shown below: $S^{(t)}$ represents an estimate of a current S state. Each regressor $r_t$ (,) will be derived by analyzing the current state $S^{(t)}$ and an input image I in each cascade. The formula is as follows:

$$S^{(t+1)}=S^{(t)}+r_t(I,S^{(t)})$$

The most critical part of the cascade is that its prediction is based on features. For example, gray scale values of pixels are calculated from I, which is related to the current state.

This embodiment uses a gradient boosting learning regression tree to train each $r_t$, and uses the least square method to minimize the errors. t represents a serial number of the cascade and $r_t$ (,) represents the regressor of the current stage. The input parameters of the regressor are updated feature points of the image I and the previous stage of the regressor, and the adopted features may be gray scale values or other. Each regressor is composed of many trees, and the parameters of each tree are acquired by training based on the coordinate difference between the current shape and the approved ground truth and randomly selected pixel pairs.

Figure 3:
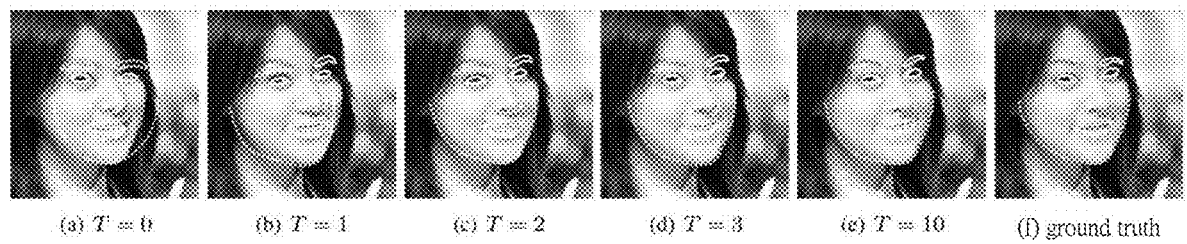
FIG. 3 is a schematic diagram of an operation of acquiring key points of a human face according to an embodiment of the present invention.

Please refer to FIG. 3, in the process of learning Tree, ERT directly stores the updated value of the shape into a leaf node. A final face key point position can be acquired from the initial position S with all learned trees, a mean shape and all passed leaf nodes.

Step 3: Align the image with the standard human face to get the corresponding hair region.

For the alignment of the human face, 68 detected feature points of the input human face need to be matched and aligned with 68 feature points of the standard human face. That is, to solve a two-dimensional affine transformation:

$$\begin{bmatrix}u\\v\end{bmatrix}=s\begin{bmatrix}\cos\theta & \sin\theta\\\sin\theta & \cos\theta\end{bmatrix}\begin{bmatrix}x\\y\end{bmatrix}+\begin{bmatrix}t_1\\t_2\end{bmatrix}$$

$$sR\begin{bmatrix}x\\y\end{bmatrix}+T$$

In the above formula, s is a scaling ratio, θ is a rotation angle, t represents a displacement of translation, and R is an orthogonal matrix.

$$R^TR=I$$

The following uses the least square method to solve the rotation, translation, and scaling matrix so that the first vector is aligned to points of the second vector as much as possible. The two shape matrices are p and q respectively. Each row of the matrix represents the x, y coordinates of a feature point. Assume that there are 68 feature point coordinates, then $p \in R^{68 \times 2}$. The objective function of least squares is:

$$\operatorname{argmin}_{s,\theta,t} \sum_{i=1}^{68} \|sRp_i^T + T - q_i^T\|^2$$

Among them $p_i$ is the i-th row of the p matrix. Rewrite in a matrix form:

$$\operatorname{argmin}_{s,R,T} \|sRp^T + T - q^T\|_F$$

$$R^T R = I$$

$\|\cdot\|_F$ represents the F norm (Frobenius) operation.

This equation has an analytical solution. First, the effect of translation can be eliminated by subtracting the average of all 68 points for each point:

$$\hat{x} = \frac{x_1 + x_2 + \ldots + x_k}{68}$$

$$\hat{y} = \frac{y_1 + y_2 + \ldots + xy_k}{68}$$

Each point is then subtracted by a corresponding data mean:

$$(x,y) \rightarrow (x-\hat{x}, y-\hat{y}).$$

Furthermore, the impact of scaling can be eliminated by dividing processed points with a mean square root distance s:

$$\left( \frac{x_1 - \hat{x}}{s}, \frac{y_1 - \hat{y}}{s} \right).$$

After the above processing, the analytical solution of the problem can be derived:

$$M = BA^T$$

$$svd(M) = U \sum V^T$$

$$R = UV^T$$

In this way, R can be derived. Through the above solution, the warping function corresponding to the human face alignment, that is, the corresponding s, R, T can be derived. By applying the derived warping function to the cutout hair style mask, the aligned hair style can be acquired.

Step 4: Calculate Minkowski distances between the hair region and hair masks of all frontal faces in the hair style database.

First, a hair mask retrieval based on the Minkowski includes: taking out hair style masks corresponding the two aligned images, and comparing the shape similarity of the two hair style masks via a Minkowski distance. The Minkowski distance is more for determining an area of non-overlapping regions. More non-overlapping regions are corresponding to a larger Minkowski distance. Then, a hair style mask to be retrieved is defined as H, and a hair style mask in the hair style database is B. The corresponding Minkowski distance is:

$$d = \sqrt[p]{\sum_{k=1}^{n} |H^k - B_i^k|^p}$$

k is a subscript after pulling masks into one dimensional vectors, P is a parameter of Minkowski distance, where p can be taken as 2. Through the above formula, the currently input hair style can be compared with all hair styles in the database to derive corresponding Minkowski distances, which are sorted from small to large to acquire a score ranking vector M of the corresponding hair styles in the hair style database.

Then, adding weights of prominent features includes: giving corresponding higher weights for very prominent hair style features such as hair bangs, so that the retrieved hair styles are as similar as possible in the bangs part. 25% weight is added for all retrieved candidate hair styles based on the forehead part. Assume that a standard head bangs region is L, after human face alignment, an L region of the input photo is compared with an L region of the standard head for all inconsistencies, wherein places with the inconsistencies are increased by 1.25-fold weight, so that the input photo and the compared standard head have a lower degree of similarity. These prominent regions and previous Minkowski distances are added and sorted, to derive an improved Minkowski distance vector $M_2$.

Secondly, the hair style retrieval based on a Hosdorff distance includes:

when retrieving a hair matching degree, the details of the hair style are very important indicators. For example, some hairstyles may have very thin and long braids on both sides, so this feature may not have a very important effect on the overlapped region of the mask, but it is very important for the human perception. The Hosdorff distance is used here so that the hair details can be preserved accordingly. The Hosdorff distance actually evaluates how much difference of the most different places between the two hairstyles. We still define the hair style mask to be retrieved as H and a standard hair style in the hair style database as B. A corresponding Hosdorff distance is:

$$d_H(H, B) = \max \left\{ \inf_{h \in H, b \in B} d(h, b), \inf_{b \in B, h \in H} d(h, b) \right\}$$

wherein sup represents an upper definite boundary, and inf represents a lower definite boundary. Similarly, the above formula is used to compare the current input hair style with all the hair styles in the database to derive corresponding Minkowski distances, which are sorted from small to large to acquire a ranking vector H.

Finally, the hair style retrieval based on the hair flow information includes: in order to make the retrieved hair style is as similar as possible with respect to flow direction and degrees of curliness or straightness, a flow direction field of hair is acquired by the gradient-based method first; generally, flow direction of the hair and a gradient field of the hair should be perpendicular, so the horizontal gradient of the hair of the input hair style image I is found first:

$$d_x(i,j)=[I(i+1,j)-I(i-1,j)]/2$$

Then the longitudinal gradient of the hair is found:

$$d_y(i,j)=[I(i,j+1)-I(i,j-1)]/2$$

A flow direction field C of the hair meets:

$$[C_x,C_y]\cdot[d_x,d_y]^T=0$$

The flow direction field C can be derived from the above equations.

Different hair styles have different flow direction fields. After the flow direction information is acquired, the similarity information C is acquired by comparing flow directions of pixel points on each hair with flow directions of corresponding points of candidate hair. The similarity information Cis also added as an evaluation standard for sorting, to acquire a sorting vector L.

Figure 4:
FIG. 4 is a schematic diagram of different types of hair data according to an embodiment of the present invention.

Please refer to FIG. 4. Step 5: Hair style recognition and matching based on hair basic blocks: utilizing a large amount of four different types (straight hair, curly hair, braided hair and fine curly hair) of labeled hair data and a deep learning network to build a model training, to acquire a HairNet.

Please refer to FIG. 5 and FIGS. 6a-6d. First, the input hair is sampled through Gaussian pyramid to generate input images of different scales and standard images in the hair style database of different scales. Next, the hair portion is performed with super pixel division to acquire hair blocks with different sizes, and then these hair blocks are enlarged universally, to acquire patches with the same size. These small patches are introduced into the HairNet, to finally acquire the maximum probability of which type that each small patch belongs to.

After acquiring the hair types of the different basic blocks of the input hair and the candidate hair styles, the input hair and the candidate hair style in the hair style database are matched. The specific method is to divide the hair into blocks, and then perform calculation on different points with respect to multiple scales, to acquire the deviation values of different candidate hair styles.

Step 6: Retrieve based on combination of multiple features includes: acquiring the sorting $M_2$ according to combination of the above Minkowski distances and the prominent features after hair separation and alignment of the input frontal picture of the character, then acquiring the sorting H according to the calculated Hosdorff distances, and acquiring the sorting L by combining the hair flow directions. Weights a: b: c are assigned to combine three vectors into an overall sorting vector F:

$$F=aM_2+bH+cL$$

The F is sorted from small to large, and first N elements are selected as candidate hair styles. In the N candidate hair styles, the previously trained HairNet is utilized for sorting according to degrees of similarity of hair curliness or straightness. A highest ranked is selected as a final retrieved candidate result R.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A human hairstyle generation method, based on multi-feature retrieval and deformation, comprising following steps:
   step 1: acquiring a hair style mask of a single frontal image of a human face;
   step 2: identifying feature points of the human face and match the feature points with a standard human face of a hair style database;
   step 3, aligning the single frontal image with the standard human face to acquire a corresponding hair region;
   step 4: calculating Minkowski distances between the hair region and hair masks of all frontal faces in the hair style database, and assigning corresponding weights after sorting the Minkowski distances from small to large;
   step 5: calculating flow direction fields of some of most similar hair styles for performing matching operation with a detecting hair style;
   step 6: training a deep learning network to detect hair styles of hair basic blocks at different scales, and matching the detecting hair style with a histogram of a plurality of candidate hair styles with a plurality of scales, to acquire different matching scores; and
   finally, taking out a most similar hair style picture.

2. The human hairstyle generation method of claim 1 further comprising:
   calculating hair detail similarity via a Hosdorff distance, and repeating the step 4 for assigning the weights; and
   combining the weights of the step 4 to sort the matched hair styles, and taking out ten most similar hair styles.

3. The human hairstyle generation method of claim 2, wherein the step 4 comprises:
   retrieving the hair style mask based on the Minkowski distances;
   adding weights with respect to prominent features;
   retrieving the hair style mask again based on a Hosdorff distance; and
   retrieving the hair style mask based on hair flow information.

4. The human hairstyle generation method of claim 3, wherein the hair style mask to be retrieved in the step 4 is defined as H, and a hair style mask in the hair style database is B, and a corresponding Minkowski distance is:

$$d = \sqrt[P]{\sum_{k=1}^{n} |H^k - B_i^k|^P}$$

wherein k is a subscript after pulling masks into one dimensional vectors, P is a parameter of Minkowski distance, where p can be taken as 2, and through the above formula, the detecting hair style is compared with all hair styles in the hair style database to derive the corresponding Minkowski distances, which are sorted from small to large to acquire a score ranking vector M of the corresponding hair styles in the hair style database.

5. The human hairstyle generation method of claim 4, wherein the step 4 comprises:
   assigning corresponding higher weights for prominent hair style features;
   adding 25% weight for all the retrieved candidate hair styles based on a forehead part;
   setting a standard head bangs region as L, and comparing an L region of the single frontal image with an L region of a standard head for all inconsistencies after human face alignment, wherein places with the inconsistencies are increased by 1.25-fold weight; and adding and sorting prominent regions and the previous Minkowski distances, to derive an improved Minkowski distance vector $M_2$.

6. The human hairstyle generation method of claim 5, wherein the hair style mask to be retrieved is defines as H and the standard hair style in the hair style database is defines as B in the step 4, and a corresponding Hosdorff distance is $$d_H(H, B) = \max\left\{\inf_{h\in H, b\in B} d(h, b), \inf_{b\in B, h\in H} d(h, b)\right\}$$

wherein sup represents an upper definite boundary, and inf represents a lower definite boundary, and the above formula is utilized for comparing the current detecting hair style with all the hair styles in the hair style database to derive the corresponding Minkowski distances, which are sorted from small to large to acquire a ranking vector H.

7. The human hairstyle generation method of claim 6, wherein the step 4 comprises:

acquiring the flow direction fields of the detecting hair style via a gradient-based method;

for the single frontal image, finding a horizontal gradient of the detecting hair style:

$d_x(i,j)=[I(i+1,j)-I(i-1,j)]/2;$ finding a longitudinal gradient of the detecting hair style:

$d_y(i,=[I(i,j+1)-I(i,j-1)]/2;$ wherein a flow direction field C of the detecting hair style meets:

$[C_x,C_y]\cdot[d_x,d_y]^T=0;$ deriving the flow direction field C from the above equations; and adding similarity of C as an evaluation standard for sorting, to acquire a sorting vector L.

8. The human hairstyle generation method of claim 7, wherein the step 5 comprises hair style recognition and matching based on the hair basic blocks:

utilizing different types of labeled hair data and a deep learning network to build a model training, to acquire a HairNet;

sampling an input hair through a Gaussian pyramid to generate input images of different scales and standard images in the hair style database of different scales;

performing super pixel division on a hair portion, and enlarging hair blocks universally, to acquire patches with a same size; and introducing the patches into the HairNet.

9. The human hairstyle generation method of claim 8, wherein the step 6 comprises retrieving based on combination of multiple features:

assigning weights a: b: c for $M_2$, H and L, respectively, and combining the three vectors into an overall sorting vector F:

$F=aM_2+bH+cL;$ sorting the F from small to large and selecting first N elements as the candidate hair styles; and sorting the N candidate hair styles according to degrees of similarity of hair curliness or straightness, to select a highest ranked as a final retrieved candidate result.

10. The human hairstyle generation method of claim 2, wherein aligning and matching the feature points of the human face with the feature points of the standard human face in the step 3 is solving a two-dimensional affine transformation:

$$\begin{bmatrix} u \\ v \end{bmatrix} = s\begin{bmatrix} \cos\theta & \sin\theta \\ \sin\theta & \cos\theta \end{bmatrix}\begin{bmatrix} x \\ y \end{bmatrix} + \begin{bmatrix} t_1 \\ t_2 \end{bmatrix}$$

$$sR\begin{bmatrix} x \\ y \end{bmatrix} + T$$

wherein s is the scaling ratio, is the rotation angle, t represents the displacement of translation, where R is an orthogonal matrix in the above formula.

11. The human hairstyle generation method of claim 1, wherein aligning and matching the feature points of the human face with the feature points of the standard human face in the step 3 is solving a two-dimensional affine transformation:

$$\begin{bmatrix} u \\ v \end{bmatrix} = s\begin{bmatrix} \cos\theta & \sin\theta \\ \sin\theta & \cos\theta \end{bmatrix}\begin{bmatrix} x \\ y \end{bmatrix} + \begin{bmatrix} t_1 \\ t_2 \end{bmatrix}$$

$$sR\begin{bmatrix} x \\ y \end{bmatrix} + T$$

wherein s is the scaling ratio, is the rotation angle, t represents the displacement of translation, where R is an orthogonal matrix in the above formula.

* * * * *